(12) United States Patent
Klassen et al.

(10) Patent No.: US 9,009,264 B2
(45) Date of Patent: Apr. 14, 2015

(54) INSTANT MESSAGING DEVICE/SERVER PROTOCOL

(75) Inventors: Gerhard Dietrich Klassen, Waterloo (CA); Christopher R. Wormald, Kitchener (CA); Andreea Manolescu, Toronto (CA)

(73) Assignee: BlackBerry Limited, Waterloo, Ontario (CA)

( * ) Notice: Subject to any disclaimer, the term of this patent is extended or adjusted under 35 U.S.C. 154(b) by 1532 days.

(21) Appl. No.: 11/416,193

(22) Filed: May 3, 2006

(65) Prior Publication Data

US 2007/0094337 A1    Apr. 26, 2007

Related U.S. Application Data

(60) Provisional application No. 60/728,741, filed on Oct. 21, 2005.

(51) Int. Cl.
*G06F 15/16*    (2006.01)
*H04L 12/58*    (2006.01)
(Continued)

(52) U.S. Cl.
CPC .......... *H04L 12/581* (2013.01); *H04L 12/5815* (2013.01); *H04L 12/5835* (2013.01); *H04L 51/04* (2013.01); *H04L 51/043* (2013.01); *H04L 51/066* (2013.01); *H04M 1/72552* (2013.01); *H04L 12/5895* (2013.01); *H04L 67/34* (2013.01); *H04L 69/24* (2013.01)

(58) Field of Classification Search
USPC ................ 709/206, 229, 248, 208–211, 200, 709/201–203, 217–219; 455/466, 412.2, 455/414.1–414.4; 715/229, 733–734, 715/750–752
See application file for complete search history.

(56) References Cited

U.S. PATENT DOCUMENTS 6,549,937 B1 *  4/2003  Auerbach et al. ............. 709/206
6,892,230 B1    5/2005  Gu et al.
(Continued)

FOREIGN PATENT DOCUMENTS

EP    1549024 A1    6/2005
EP    1587332 A1    10/2005
(Continued)

OTHER PUBLICATIONS

International Search Report for PCT/CA2006/000704; pp. 1-5.
(Continued)

*Primary Examiner* — Greg C Bengzon
(74) *Attorney, Agent, or Firm* — Fleit Gibbons Gutman Bongini & Bianco P.L.

(57) ABSTRACT

A generic IM device/server protocol permits a single implementation of a IM application on client devices for communicating with different enterprise IM servers types. The protocol defines a server maintained tag to identify the currency of a contact list it is managing for a client device. The client device receives and persists the tag and provides it at login. The server automatically sends a contact list update only if the tag indicates the client devices contact list instance is not current. Presence updates may also be sent automatically at login and the client device need not separately request contact list or presence updates at login. The client device may be pre-provisioned with respective graphics, text and server capabilities for multiple server types. A specific IM configuration may be selected in response to service information.

30 Claims, 7 Drawing Sheets

(51) Int. Cl.
*H04M 1/725* (2006.01)
*H04L 29/08* (2006.01)
*H04L 29/06* (2006.01)

(56) References Cited

U.S. PATENT DOCUMENTS

| | | | |
|---|---|---|---|
| 7,120,455 B1 * | 10/2006 | Chen et al. | 455/466 |
| 7,266,583 B2 * | 9/2007 | Fitzpatrick et al. | 709/205 |
| 7,266,594 B2 * | 9/2007 | Kumbalimutt et al. | 709/221 |
| 7,359,943 B2 * | 4/2008 | Szeto et al. | 709/206 |
| 7,613,472 B2 * | 11/2009 | Northcutt | 455/466 |
| 7,640,300 B2 * | 12/2009 | Wohlgemuth et al. | 709/204 |
| 2002/0006803 A1 * | 1/2002 | Mendiola et al. | 455/466 |
| 2002/0120760 A1 | 8/2002 | Kimchi et al. | |
| 2002/0129103 A1 * | 9/2002 | Birkler et al. | 709/203 |
| 2003/0119540 A1 | 6/2003 | Mathis | |
| 2003/0177184 A1 * | 9/2003 | Dickerman et al. | 709/204 |
| 2003/0182428 A1 * | 9/2003 | Li et al. | 709/227 |
| 2003/0220972 A1 | 11/2003 | Montet et al. | |
| 2004/0015547 A1 | 1/2004 | Griffin et al. | |
| 2004/0128352 A1 * | 7/2004 | Srinivas et al. | 709/204 |
| 2004/0205175 A1 | 10/2004 | Kammerer | |
| 2005/0172001 A1 | 8/2005 | Zaner et al. | |
| 2005/0271004 A1 * | 12/2005 | Cho | 370/328 |
| 2006/0069727 A1 * | 3/2006 | Fuller et al. | 709/206 |
| 2006/0195532 A1 * | 8/2006 | Zlateff et al. | 709/206 |
| 2006/0271696 A1 * | 11/2006 | Chen et al. | 709/229 |
| 2007/0055742 A1 * | 3/2007 | Hebert et al. | 709/217 |
| 2007/0079237 A1 * | 4/2007 | Abrams et al. | 715/700 |
| 2007/0083675 A1 * | 4/2007 | Vemulapelli et al. | 709/246 |
| 2008/0120387 A1 * | 5/2008 | Werndorfer et al. | 709/206 |

FOREIGN PATENT DOCUMENTS

| | | |
|---|---|---|
| WO | WO 03/025776 A1 | 3/2003 |
| WO | WO 03/094011 A1 | 11/2003 |
| WO | WO 2004/027562 A2 | 4/2004 |
| WO | WO 2004/031976 A1 | 4/2004 |
| WO | WO 2006/026039 A1 | 3/2006 |

OTHER PUBLICATIONS

RFC 2778—A Model for Presence and Instant Messaging; The Internet Society: Feb. 2000: Available from http://www.faqs.org/rfcs/rfc2778.html.

"BlackBerry Enterprise Server for Microsoft Exchange, Version 4.0, Feature and Technical Overview": Research in Motion Limited; 2004; Retrieved from the internet at http://support.vodafone.de/docs/Feature_and_Technical_Overview_besx4.pdf.

"BlackBerry Enterprise Sever for Microsoft Exchange, Version 4.0, Installation Guide"; Research in Motion: 2004; Retrieved from the internet at http:/www.codetel.com.do/Productosyservicios/blackberry/archivos_pdf/Exchange/Installation_Guide.pdf.

Extended Search Report from European Application No. 067414413.3 dated Sep. 9, 2008.

Poppe, Fabrice; Search Report from corresponding European Application No. 10167354.9; search completed Aug. 9, 2010.

Poppe, Fabrice; Search Report from corresponding European Application No. 11167063.4; search completed Nov. 3, 2011.

* cited by examiner

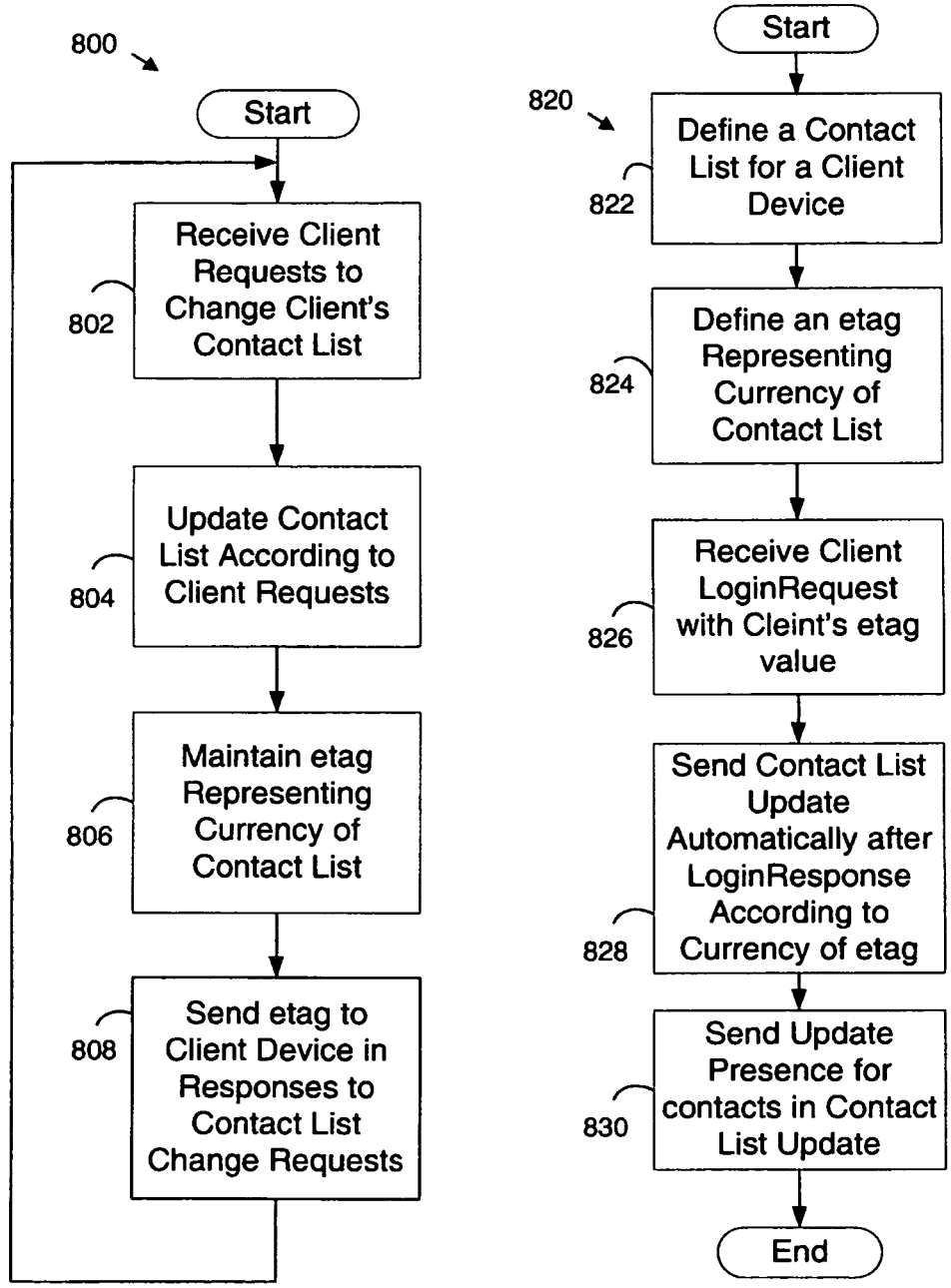

INSTANT MESSAGING DEVICE/SERVER PROTOCOL

This application claims priority from U.S. Provisional Patent Application No. 60/728,741 filed Oct. 21, 2005, the contents of which are incorporated herein by reference.

FIELD OF THE INVENTION

The present application relates to a protocol for instant messaging (IM) and more particularly to a protocol for instant message communications between a client device and an enterprise IM server.

BACKGROUND OF THE INVENTION

Communication devices such as personal computers, wireless mobile devices, smart telephones, personal data assistants, etc. often provide data communication abilities to users. One currently popular form of such communication is Instant Messaging (IM) facilitated by a client application having a graphical user interface (GUI) whereby two or more users of respective communication devices can engage in a conversational data communication exchange.

To permit IM message exchanges, a user may invite another to agree to receive IM messages and be included in the user's list of IM contacts (sometimes called an IM friend or buddy in view of the agreement to be a potential IM message recipient). The availability of particular contacts for conversations may be maintained in accordance with respective presence information. To begin an IM conversation, a user selects a contact represented by a contact list entry of a list of contacts and inputs a message. Additional contacts may be invited to engage in a group message, as desired. While IM messaging was originally limited to text, newer protocols support file transports and voice over data communications. In addition to conducting conversations, an IM user may invite a buddy to engage in an on-line game where two (or more players) take turns during game play to compete against each other. Conventional board and card games such as checkers or poker may be adapted for IM game playing for example, among others.

IM communications between client devices are facilitated by IM servers, which in an enterprise context such as a business serving a plurality of client devices, is an enterprise server providing IM services (hereinafter "an enterprise IM server"). Client devices of a particular enterprise communicate IM communications through that enterprises' enterprise IM server (or servers). The enterprise IM server may provide functions to the client devices such as contact list management, presence information management, message routing, logging and archiving, encryption, security (e.g. virus scanning), authentication, etc.

Enterprise IM servers are commercially available from different entities such as the IBM Lotus Sametime™ of International Business Machine Corporation, Novell GroupWise® of Novell, Inc., Microsoft® Office Live Communications Server from Microsoft Corporation, among others. Such servers may be used with a variety of client devices, including wireless mobile devices such as smart phones and PDAs, PCs and other devices available from potentially many different manufacturers or providers. Client devices may be configured for running client-side IM applications which may originate from the client device provider or from yet other application providers.

Often when a client device is configured prior to entering the marketplace for eventual distribution to a user, the enterprise IM server with which the device is intended to be used is unknown. Occasionally, a particular client device may be used with different enterprise IM servers over its lifetime. It is thus desirable to configure IM applications for execution on a client device that may be compatible with more than one enterprise IM server. Similarly it is desirable to configure enterprise IM servers to enable IM communications with different client devices.

A solution to one or more of these needs is therefore desired.

BRIEF DESCRIPTION OF THE DRAWINGS

In order that the subject matter may be readily understood, embodiments are illustrated by way of examples in the accompanying drawings, in which:

FIGS. 8A and 8B are flow diagrams showing operations for device/server communications using an IM protocol in accordance with an embodiment.

DETAILED DESCRIPTION

Persons of ordinary skill in the art will appreciate that teachings herein are applicable to messages received via wired or wireless communication and though a wireless communication device and network including wireless communication capabilities are discussed in the examples, no limitations should be imposed.

There is provided an IM device/server communications protocol to facilitate implementation of a single protocol on a client device that may be used to communicate to different IM servers. In an embodiment, the client device communicates with one IM server at a time. Although it is not specifically the intent to enable merging of different IM communities, the communications protocol described herein may technically enable just that.

In accordance with a feature of the protocol, the enterprise IM server defines an id tag for a user to identify the state of a user's contact list. The client device can then persist a local copy of the contact list. The client sends this id on login and the server can use the id to decide if the contact list has changed. If it hasn't then the contact list does not need to be sent.

In accordance with another feature of the protocol, the enterprise IM server automatically sends contact list and presence updates as a response to the initial login instead of in response to separate specific requests.

In accordance with yet another feature of the protocol, the client device uses images and text in the to provide an experience similar to the particular desktop variant. These are also used to define the capabilities of the server.

Figure 1:
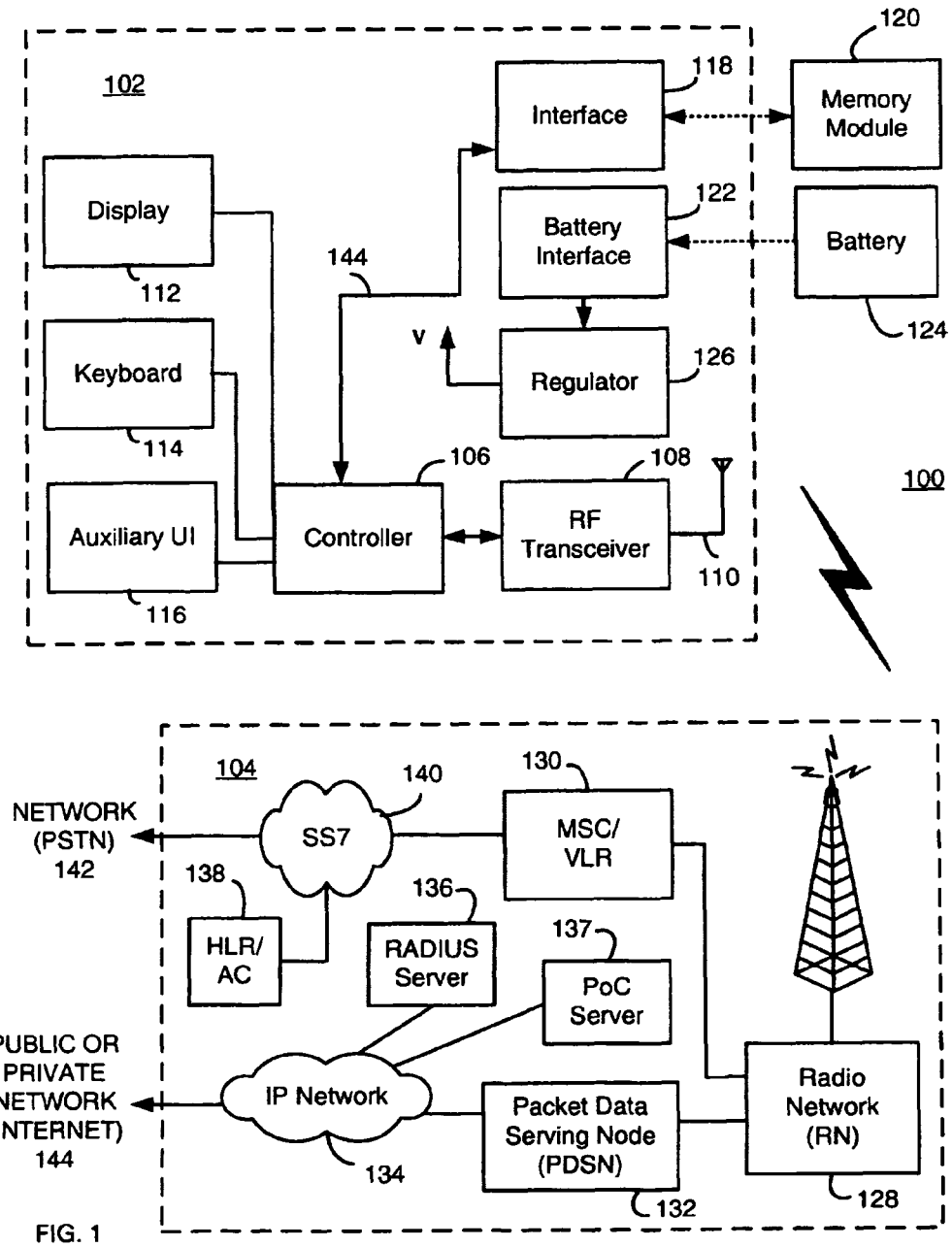
FIG. 1 is a block diagram which illustrates pertinent components of an example wireless communication network and a mobile station which communicates within this network.

FIG. 1 is a block diagram of a communication system 100 which includes a mobile station 102 which communicates through a wireless communication network 104. Mobile station 102 preferably includes a visual display 112, a keyboard 114, and perhaps one or more auxiliary user interfaces (UI) 116, each of which is coupled to a controller 106. Controller 106 is also coupled to radio frequency (RF) transceiver circuitry 108 and an antenna 110.

Typically, controller 106 is embodied as a central processing unit (CPU) which runs operating system software in a memory component (not shown). Controller 106 will normally control overall operation of mobile station 102, whereas signal processing operations associated with communication functions are typically performed in RF transceiver circuitry 108. Controller 106 interfaces with device display 112 to display received information, stored information, user inputs, and the like. Keyboard 114, which may be a telephone type keypad or full alphanumeric keyboard, is normally provided for entering data for storage in mobile station 102, information for transmission to network 104, a telephone number to place a telephone call, commands to be executed on mobile station 102, and possibly other or different user inputs.

Mobile station 102 sends communication signals to and receives communication signals from network 104 over a wireless link via antenna 110. RF transceiver circuitry 108 performs functions similar to those of a radio network (RN) 128, including for example modulation/demodulation and possibly encoding/decoding and encryption/decryption. It is also contemplated that RF transceiver circuitry 108 may perform certain functions in addition to those performed by RN 128. It will be apparent to those skilled in art that RF transceiver circuitry 108 will be adapted to particular wireless network or networks in which mobile station 102 is intended to operate.

Mobile station 102 includes a battery interface 122 for receiving one or more rechargeable batteries 124. Battery 124 provides electrical power to electrical circuitry in mobile station 102, and battery interface 122 provides for a mechanical and electrical connection for battery 124. Battery interface 122 is coupled to a regulator 126 which regulates power to the device. When mobile station 102 is fully operational, an RF transmitter of RF transceiver circuitry 108 is typically turned on only when it is sending to network, and is otherwise turned off to conserve resources. Similarly, an RF receiver of RF transceiver circuitry 108 is typically periodically turned off to conserve power until it is needed to receive signals or information (if at all) during designated time periods.

Mobile station 102 operates using a memory module 120, such as a Subscriber Identity Module (SIM) or a Removable User Identity Module (R-UIM), which is connected to or inserted in mobile station 102 at an interface 118. As an alternative to a SIM or an R-UIM, mobile station 102 may operate based on configuration data programmed by a service provider into an internal memory which is a non-volatile memory. Mobile station 102 may consist of a single unit, such as a data communication device, a cellular telephone, a multiple-function communication device with data and voice communication capabilities, a personal digital assistant (PDA) enabled for wireless communication, or a computer incorporating an internal modem. Alternatively, mobile station 102 may be a multiple-module unit comprising a plurality of separate components, including but in no way limited to a computer or other device connected to a wireless modem. In particular, for example, in the mobile station block diagram of FIG. 1, RF transceiver circuitry 108 and antenna 110 may be implemented as a radio modem unit that may be inserted into a port on a laptop computer. In this case, the laptop computer would include display 112, keyboard 114, and one or more auxiliary UIs 116, and controller 106 may remain within the radio modem unit that communicates with the computer's CPU or be embodied as the computer's CPU. It is also contemplated that a computer or other equipment not normally capable of wireless communication may be adapted to connect to and effectively assume control of RF transceiver circuitry 108 and antenna 110 of a single-unit device such as one of those described above. Such a mobile station 102 may have a more particular implementation as described later in relation to mobile station 202 of FIG. 2.

Mobile station 102 communicates in and through wireless communication network 104. In the embodiment of FIG. 1, wireless network 104 is a Third Generation (3G) supported network based on Code Division Multiple Access (CDMA) technologies. In particular, wireless network 104 is a CDMA2000 network which includes fixed network components coupled as shown in FIG. 1. Wireless network 104 of the CDMA2000-type includes a Radio Network (RN) 128, a Mobile Switching Center (MSC) 130, a Signaling System 7 (SS7) network 140, a Home Location Register/Authentication Center (HLR/AC) 138, a Packet Data Serving Node (PDSN) 132, an IP network 134, and a Remote Authentication Dial-In User Service (RADIUS) server 136. SS7 network 140 is communicatively coupled to a network 142 (such as a Public Switched Telephone Network or PSTN), whereas IP network is communicatively coupled to a network 144 (such as the Internet). Persons of ordinary skill in the art will appreciate that other networks and associated topologies including GPRS, E-GPRS and UMTS radio networks, among many others, may be employed with the teachings herein.

During operation, mobile station 102 communicates with RN 128 which performs functions such as call-setup, call processing, and mobility management. RN 128 includes a plurality of base station transceiver systems that provide wireless network coverage for a particular coverage area commonly referred to as a "cell". A given base station transceiver system of RN 128, such as the one shown in FIG. 1, transmits communication signals to and receives communication signals from mobile stations within its cell. The base station transceiver system normally performs such functions as modulation and possibly encoding and/or encryption of signals to be transmitted to the mobile station in accordance with particular, usually predetermined, communication protocols and parameters, under control of its controller. The base station transceiver system similarly demodulates and possibly decodes and decrypts, if necessary, any communication signals received from mobile station 102 within its cell. Communication protocols and parameters may vary between different networks. For example, one network may employ a different modulation scheme and operate at different frequencies than other networks. The underlying services may also differ based on its particular protocol revision.

The wireless link shown in communication system 100 of FIG. 1 represents one or more different channels, typically different radio frequency (RF) channels, and associated protocols used between wireless network 104 and mobile station 102. An RF channel is a limited resource that must be conserved, typically due to limits in overall bandwidth and a limited battery power of mobile station 102. Those skilled in art will appreciate that a wireless network in actual practice may include hundreds of cells depending upon desired overall expanse of network coverage. All pertinent components may be connected by multiple switches and routers (not shown), controlled by multiple network controllers.

For all mobile stations 102 registered with a network operator, permanent data (such as mobile station 102 user's profile) as well as temporary data (such as mobile station's 102 current location) are stored in a HLR/AC 138. In case of a voice call to mobile station 102, HLR/AC 138 is queried to determine the current location of mobile station 102. A Visitor Location Register (VLR) of MSC 130 is responsible for a group of location areas and stores the data of those mobile stations that are currently in its area of responsibility. This includes parts of the permanent mobile station data that have been transmitted from HLR/AC 138 to the VLR for faster access. However, the VLR of MSC 130 may also assign and store local data, such as temporary identifications. Mobile station 102 is also authenticated on system access by HLR/AC 138. In order to provide packet data services to mobile station 102 in a CDMA2000-based network, RN 128 communicates with PDSN 132. PDSN 132 provides access to the Internet 144 (or intranets, Wireless Application Protocol (WAP) servers, enterprise IM servers, etc.) through IP network 134. PDSN 132 also provides foreign agent (FA) functionality in mobile IP networks as well as packet transport for virtual private networking. PDSN 132 has a range of IP addresses and performs IP address management, session maintenance, and optional caching. RADIUS server 136 is responsible for performing functions related to authentication, authorization, and accounting (AAA) of packet data services, and may be referred to as an AAA server.

Wireless communication network 104 also includes a Push-to-talk over Cellular (PoC) server 137 which may be coupled to IP network 134. PoC server 137 operates to facilitate PoC individual and group communication sessions between mobile stations within network 104. A conventional PoC communication session involves a session connection between end users of mobile stations, referred to as session "participants", who communicate one at a time in a half-duplex manner much like conventional walkie-talkies or two-way radios.

Those skilled in art will appreciate that wireless network 104 may be connected to other systems, possibly including other networks, not explicitly shown in FIG. 1. A network will normally be transmitting at very least some sort of paging and system information on an ongoing basis, even if there is no actual packet data exchanged. Although the network consists of many parts, these parts all work together to result in certain behaviours at the wireless link.

Figure 2:
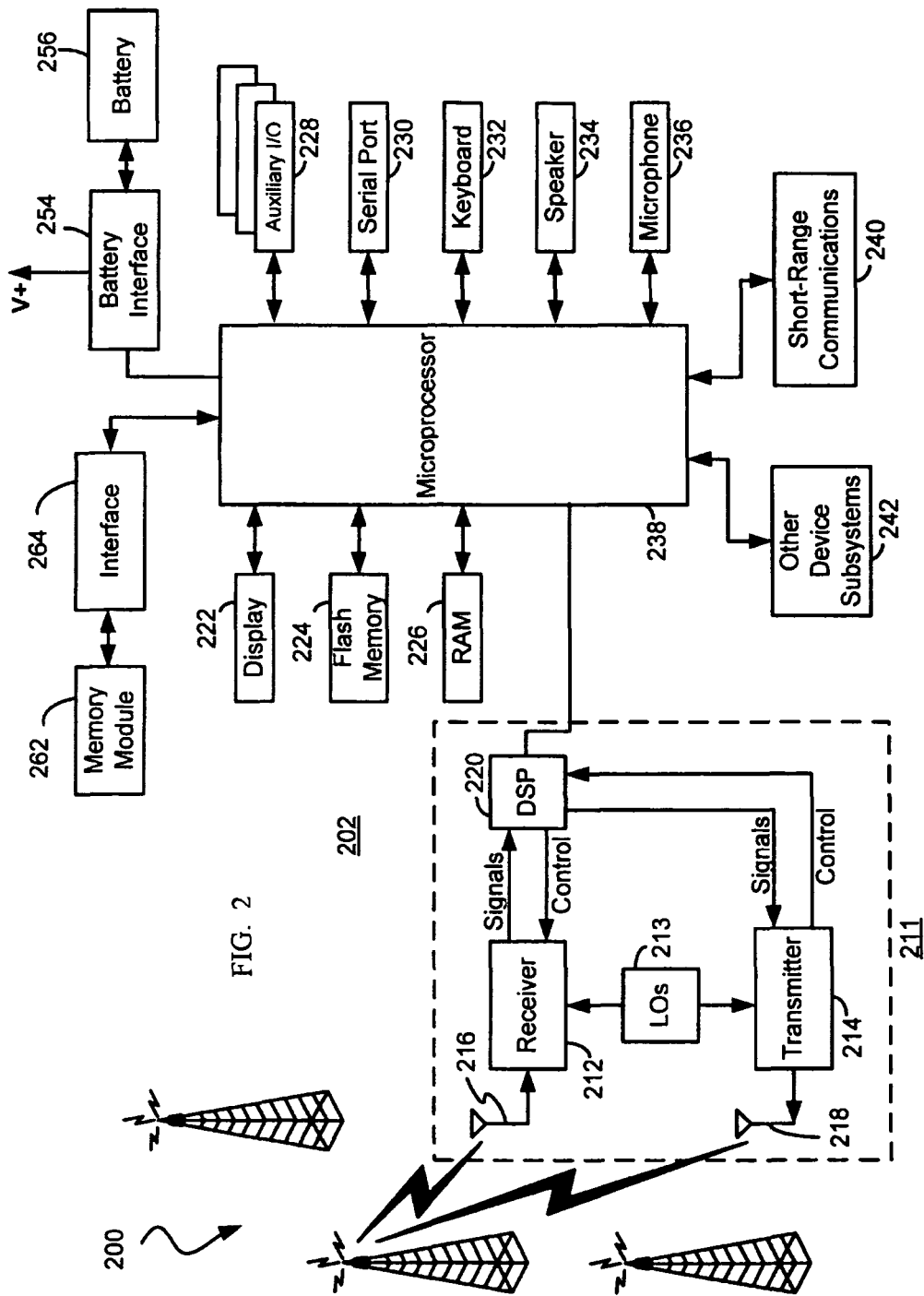
FIG. 2 is a more detailed diagram of the mobile station which may communicate within the wireless communication network.

FIG. 2 is a detailed block diagram of a preferred mobile station 202. Mobile station 202 is preferably a two-way communication device having at least voice and advanced data communication capabilities, including the capability to communicate with other computer systems. Depending on the functionality provided by mobile station 202, it may be referred to as a data messaging device, a two-way pager, a cellular telephone with data messaging capabilities, a wireless Internet appliance, or a data communication device (with or without telephony capabilities). Mobile station 202 may communicate with any one of a plurality of base station transceiver systems 200 within its geographic coverage area.

Mobile station 202 will normally incorporate a communication subsystem 211, which includes a receiver 212, a transmitter 214, and associated components, such as one or more (preferably embedded or internal) antenna elements 216 and 218, local oscillators (LOs) 213, and a processing module such as a digital signal processor (DSP) 220. Communication subsystem 211 is analogous to RF transceiver circuitry 108 and antenna 110 shown in FIG. 1. As will be apparent to those skilled in field of communications, particular design of communication subsystem 211 depends on the communication network in which mobile station 202 is intended to operate.

Mobile station 202 may send and receive communication signals over the network after required network registration or activation procedures have been completed. Signals received by antenna 216 through the network are input to receiver 212, which may perform such common receiver functions as signal amplification, frequency down conversion, filtering, channel selection, and like, and in example shown in FIG. 2, analog-to-digital (A/D) conversion. A/D conversion of a received signal allows more complex communication functions such as demodulation and decoding to be performed in DSP 220. In a similar manner, signals to be transmitted are processed, including modulation and encoding, for example, by DSP 220. These DSP-processed signals are input to transmitter 214 for digital-to-analog (D/A) conversion, frequency up conversion, filtering, amplification and transmission over communication network via antenna 218. DSP 220 not only processes communication signals, but also provides for receiver and transmitter control. For example, the gains applied to communication signals in receiver 212 and transmitter 214 may be adaptively controlled through automatic gain control algorithms implemented in DSP 220.

Network access is associated with a subscriber or user of mobile station 202, and therefore mobile station 202 requires a memory module 262, such as a Subscriber Identity Module or "SIM" card or a Removable User Identity Module (R-UIM), to be inserted in or connected to an interface 264 of mobile station 202 in order to operate in the network. Alternatively, memory module 262 may be a non-volatile memory which is programmed with configuration data by a service provider so that mobile station 202 may operate in the network. Since mobile station 202 is a mobile battery-powered device, it also includes a battery interface 254 for receiving one or more rechargeable batteries 256. Such a battery 256 provides electrical power to most if not all electrical circuitry in mobile station 202, and battery interface 254 provides for a mechanical and electrical connection for it. The battery interface 254 is coupled to a regulator (not shown in FIG. 2) which provides power V+ to all of the circuitry.

Mobile station 202 includes a microprocessor 238 (which is one implementation of controller 106 of FIG. 1) which controls overall operation of mobile station 202. This control includes network selection techniques of the present application. Communication functions, including at least data and voice communications, are performed through communication subsystem 211. Microprocessor 238 also interacts with additional device subsystems such as a display 222, a flash memory 224, a random access memory (RAM) 226, auxiliary input/output (I/O) subsystems 228, a serial port 230, a keyboard 232, a speaker 234, a microphone 236, a short-range communications subsystem 240, and any other device subsystems generally designated at 242. Some of the subsystems shown in FIG. 2 perform communication-related functions, whereas other subsystems may provide "resident" or on-device functions. Notably, some subsystems, such as keyboard 232 and display 222, for example, may be used for both communication-related functions, such as entering a text message for transmission over a communication network, and device-resident functions such as a calculator or task list. Operating system software used by microprocessor 238 is preferably stored in a persistent store such as flash memory 224, which may alternatively be a read-only memory (ROM) or similar storage element (not shown). Those skilled in the art will appreciate that the operating system, specific device applications, or parts thereof, may be temporarily loaded into a volatile store such as RAM 226.

Microprocessor 238, in addition to its operating system functions, preferably enables execution of software applications on mobile station 202. A predetermined set of applications which control basic device operations, including at least data and voice communication applications, will normally be installed on mobile station 202 during its manufacture. A preferred application that may be loaded onto mobile station 202 may be a personal information manager (PIM) application having the ability to organize and manage data items relating to user such as, but not limited to, e-mail, calendar events, voice mails, appointments, and task items. Naturally, one or more memory stores are available on mobile station 202 and SIM 262 to facilitate storage of PIM data items and other information.

The PIM application preferably has the ability to send and receive data items via the wireless network. In a preferred embodiment, PIM data items are seamlessly integrated, synchronized, and updated via the wireless network, with the mobile station user's corresponding data items stored and/or associated with a host computer system thereby creating a mirrored host computer on mobile station 202 with respect to such items. This is especially advantageous where the host computer system is the mobile station user's office or enterprise computer system. Additional applications may also be loaded onto mobile station 202 through network, an auxiliary I/O subsystem 228, serial port 230, short-range communications subsystem 240, or any other suitable subsystem 242, and installed by a user in RAM 226 or preferably a non-volatile store (not shown) for execution by microprocessor 238. Such flexibility in application installation increases the functionality of mobile station 202 and may provide enhanced on-device functions, communication-related functions, or both. For example, secure communication applications may enable electronic commerce functions and other such financial transactions to be performed using mobile station 202.

In a data communication mode, a received signal such as a text message, an e-mail message, or web page download will be processed by communication subsystem 211 and input to microprocessor 238. Microprocessor 238 will preferably further process the signal for output to display 222 or alternatively to auxiliary I/O device 228. A user of mobile station 202 may also compose data items, such as e-mail messages, for example, using keyboard 232 in conjunction with display 222 and possibly auxiliary I/O device 228. Keyboard 232 is preferably a complete alphanumeric keyboard and/or telephone-type keypad. These composed items may be transmitted over a communication network through communication subsystem 211.

For voice communications, the overall operation of mobile station 202 is substantially similar, except that the received signals would be output to speaker 234 and signals for transmission would be generated by microphone 236. Alternative voice or audio I/O subsystems, such as a voice message recording subsystem, may also be implemented on mobile station 202. Although voice or audio signal output is preferably accomplished primarily through speaker 234, display 222 may also be used to provide an indication of the identity of a calling party, duration of a voice call, or other voice call related information, as some examples.

Serial port 230 in FIG. 2 is normally implemented in a personal digital assistant (PDA)-type communication device for which synchronization with a user's desktop computer is a desirable, albeit optional, component. Serial port 230 enables a user to set preferences through an external device or software application and extends the capabilities of mobile station 202 by providing for information or software downloads to mobile station 202 other than through a wireless communication network. The alternate download path may, for example, be used to load an encryption key onto mobile station 202 through a direct and thus reliable and trusted connection to thereby provide secure device communication.

Short-range communications subsystem 240 of FIG. 2 is an additional optional component which provides for communication between mobile station 202 and different systems or devices, which need not necessarily be similar devices. For example, subsystem 240 may include an infrared device and associated circuits and components, or a Bluetooth™ communication module to provide for communication with similarly-enabled systems and devices. Bluetooth™ is a registered trademark of Bluetooth SIG, Inc.

Client devices such as a mobile station 202 or a PC etc., may be adapted to provide instant messaging (IM) communications via programming instructions and data stored or otherwise available to the client device. Instant messaging provides a conversational dialog typically involving the exchange of data messages between a user of two client devices coupled via a communications network. As persons of ordinary skill in the art will appreciate, an IM system or "presence and instant messaging system" allows users to subscribe to each other and be notified of changes in state (e.g. availability for instant message communication), and for users to send each other short instant messages. IM is discussed in further detail in "RFC 2778—A Model for Presence and Instant Messaging", maintained by the Internet Society and available at http://www.faqs.org/rfcs/rfc2778.html.

Figure 3:
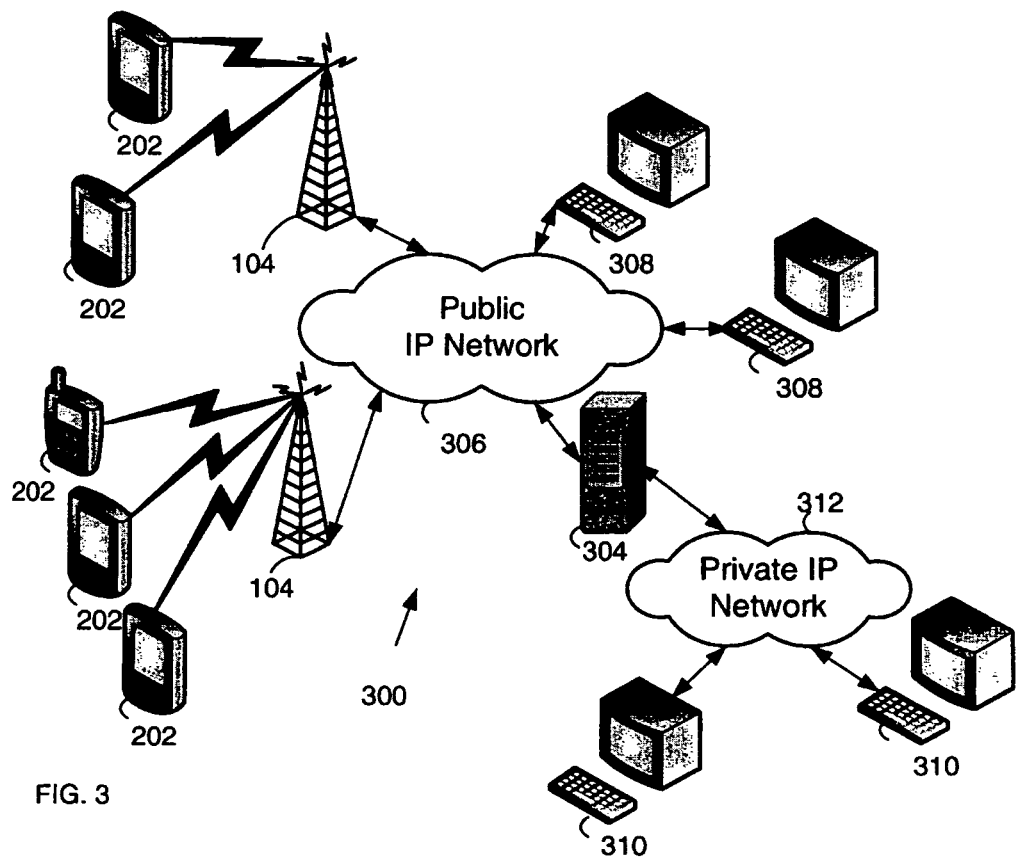
FIG. 3 is a communications network diagram configured for IM communications via an enterprise IM server.

FIG. 3 illustrates an embodiment of a IM communications network 300 for communicating IM messages among client devices 202, 308 and 310 via an enterprise IM server 304. Client devices 202 comprise mobile stations as previously described and configured as further described herein. Client devices 202 are coupled to enterprise IM server 306 via respective wireless network components (designated generally with stations 104) via public Internet Protocol (IP) network 306. While enterprise IM server 304 is shown directly coupled to the public network, persons of ordinary skill in the art will appreciate that the server 304 may be fronted by other equipment in an enterprise setting, including a firewall etc. Client devices 308 and 310 comprise PCs, laptops, workstations etc. coupled to IM server 304 via the public IP network 306 (for example via virtual private network (VPN) tunneling, etc.) or a private network 312.

Enterprise IM server 306 comprises a server computing device with IM server software such as is available from IBM, Novell, Microsoft or others as noted above and as configured as described further herein.

IM communications network 300 is an example embodiment. Other private or public networks or fewer networks may be employed.

Figure 4:
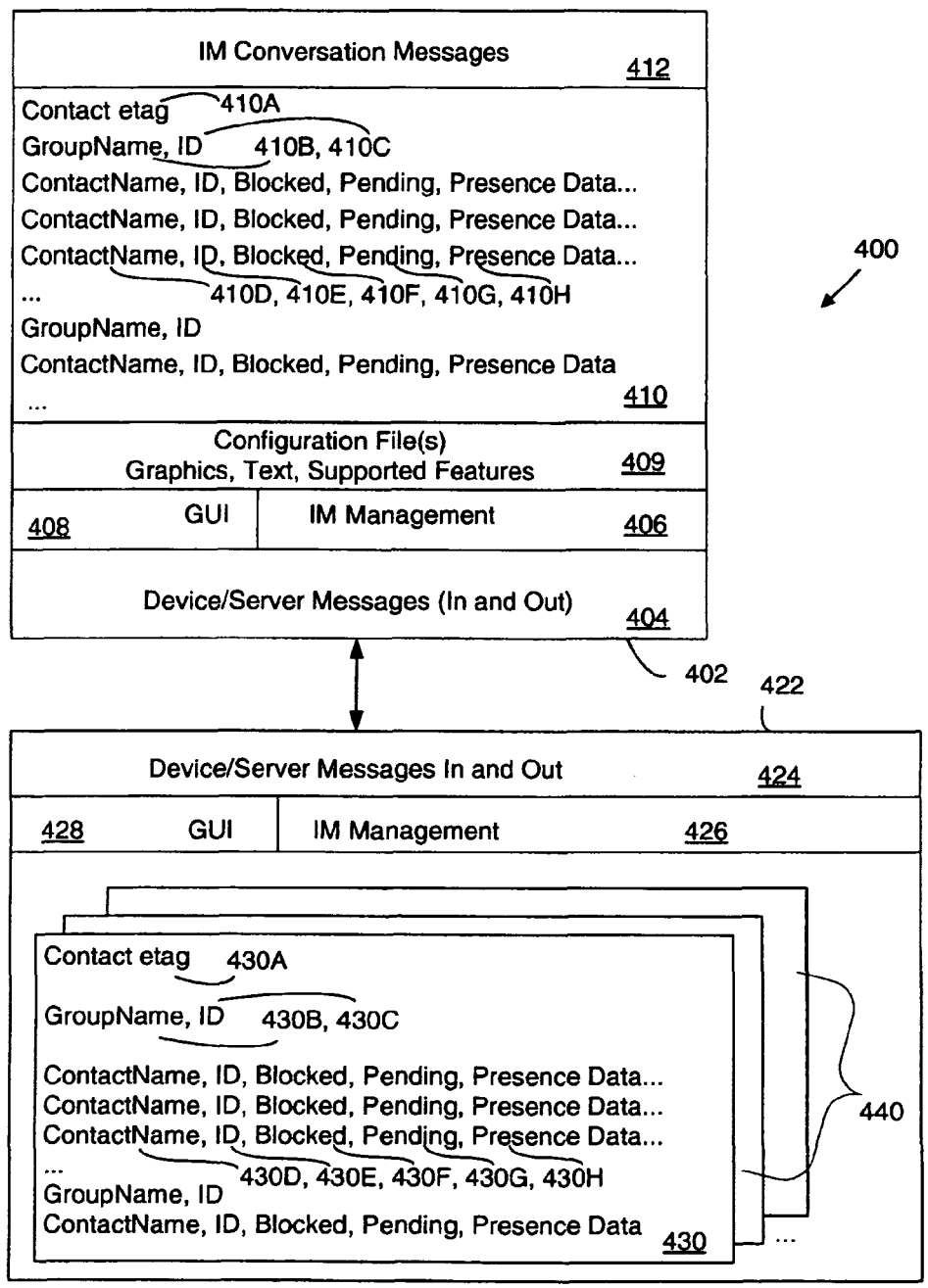
FIG. 4 is a block diagram of a representative client device component and IM server component of the network of FIG. 3.

FIG. 4 is a block diagram showing representative client device and server components 400 for IM communications in accordance with an embodiment. Client device components 402 comprise a buffer, queue or other structure(s) 404 for device/server messages (typically one for inbound and one for out bound), an IM management component 406 with GUI 408, a configuration file or files 409, a contact list 410 and buffer or other structure of current conversation messages 412. Such components 402 may be stored in one or more storage devices of or otherwise coupled locally to a client device.

A configuration file 409 is loaded and registered to the client IM management (application) 404 to provide branded and localized graphics, text and details on server capabilities as applicable. The graphics and text definitions help configure the look and feel of the IM application. More than one such file to address different enterprise IM server types (e.g. Sametime, Groupwise) etc. may be loaded and selection among the types facilitated by using a configurationID defining the IM service. Thus a specific user experience may be commonly provided to different device types (wireless and wired) in response to the enterprise IM server with which the client device communicates. GUI 408 may be configured to present the desired graphics and text, etc. and the IM management component configured for service features which may be unique to the selected server.

Server components 422 comprise similar components but adapted for serving multiple clients. Server components 422 comprise a buffer, queue or other structure(s) for device/server messages 424 (e.g. one for inbound and one for out bound), an IM management component 426 with GUI 428, a plurality of user contact lists 440 for each user including for example, a corresponding contact list 430 to list 410 of client device component 402. Such components 402 may be stored in one or more storage devices of or otherwise coupled locally to the server 304. For example, contact lists 440 may be persisted to a database coupled to the server 304.

Though not shown, server 304 may persist IM conversation messages in an archive or other form and/or maintain a log of activity for a user. Other services provided by IM Management component 426 will be apparent to those of ordinary skill in the art even though structures therefore may not be shown or described.

IM management component 406 communicates device/server messages with enterprise IM server 304 in accordance with a protocol as described herein. These messages may be broadly categorized by command type as follows: session management, contact list management, presence management, IM conversation messages and multiple participant conversations. These commands and message sequences as described further below. IM management component 406 responds to user control via GUI 408 generating appropriate device/server messages to send to server 304 as applicable and responds to device/server messages received from the server 304 defining or updating the contact list and conversation messages accordingly and notifying the user via GUI 408 and any associated API or other mechanism to other applications for the client device (not shown).

GUI 408 provides support for a contact list-oriented interface for controlling aspects of the presence and IM functions using contact list 410. List 410 comprises an etag 410A and one or more groups of contacts. Each group has a group name 410B (e.g. for display purposes) and a group ID 410C. Each contact within a group comprises a contact name 410D, contact ID 410E, blocked status 410F, pending status 410G and presence data 410H such as a presence status, status message and status icon (not shown). Similarly, server 304 maintains a server instance of etag 430A contact list data (e.g. 430B, 430C, 410D, 410E and communication status and presence data (e.g. 430E-430H).

Additional data maintained by IM Management component 406 but not shown comprises: a userID and password for defining a session with an IM server, the server name and port, an initial status Icon reference, the user's display name and contact ID, configurationID indicating an appropriate configuration.

A configuration file(s) 409 is loaded and registered to the IM application to provide branded and localized graphics, text and details on server capabilities.

As will be understood by those of ordinary skill in the art, it is sometimes difficult to make bright-line distinctions between components such as, IM management and GUI components 406 and 408. As well, it is understood that the components 406, 408 interface with other components (not shown) on or for a client device such as operating system, communication sub-system, applicable PIM or other components, etc.

Figure 5:
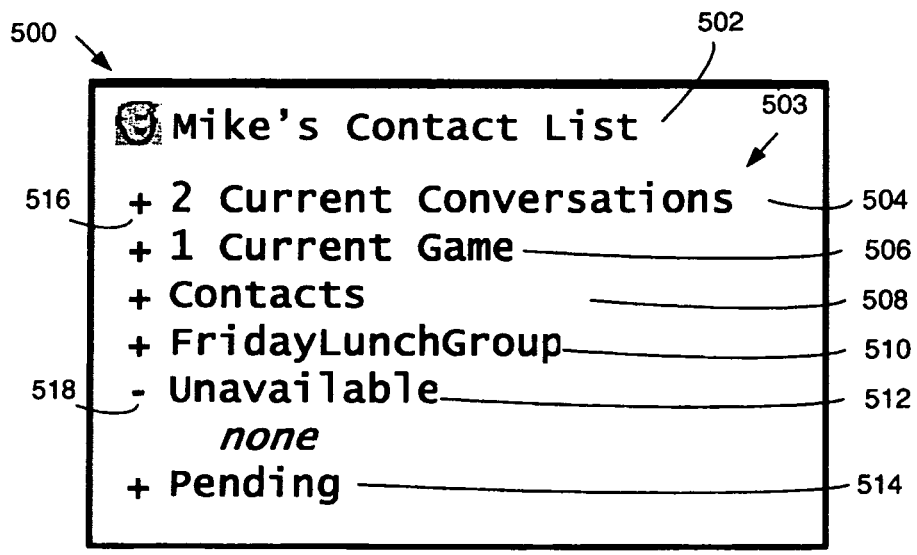
FIGS. 5 and 6 are representative GUI display views of an embodiment of an IM application.

FIG. 5 illustrates a representative view 500 of an IM screen provided by an example GUI 406 for an IM application 406 for visually representing and interacting with data defined in a contact list 410. The view 500 includes a title portion 502 showing "Mike's Contact List" for a user display name Mike and presents a contact list 503 interface comprising list entries, in particular, contact list entries for current conversations 504, current games 506, individual contacts 508, a group of contacts 510, unavailable contacts 512 and pending contacts 514. It will be understood that view 500 provides a hierarchical list in a form which permits expansion and contraction of list items via elements 516 ("+") and 518 ("−"). Contacts may comprise individual user contacts 508 or group contacts 510 (e.g. FridayLunchGroup) for assisting with the organization of contacts within the IM application. Contacts may also be grouped by presence information. Contact group 512 comprises a list of those contacts which are presently unavailable for IM communications while group 514 shows a list of those contacts who are pending the resolution of an invitation to join Mike's list of contacts in accordance with the subscription aspects of IM.

View 500 of Mike's Contacts may be traversed by a user by moving a focus about the view to interact with various elements of the GUI such as the expansion elements or individual items of the list. The focus may be indicated in various ways such as by reverse video mode, etc. Traversal or other navigation may be facilitated by input devices such as arrow keys, wheel, pointing device, etc. Once a particular element is selected by a user, particular command options may be invoked. Options may be presented via one or more menus or invoked through predefined keystrokes etc. common in the art.

Figure 6:
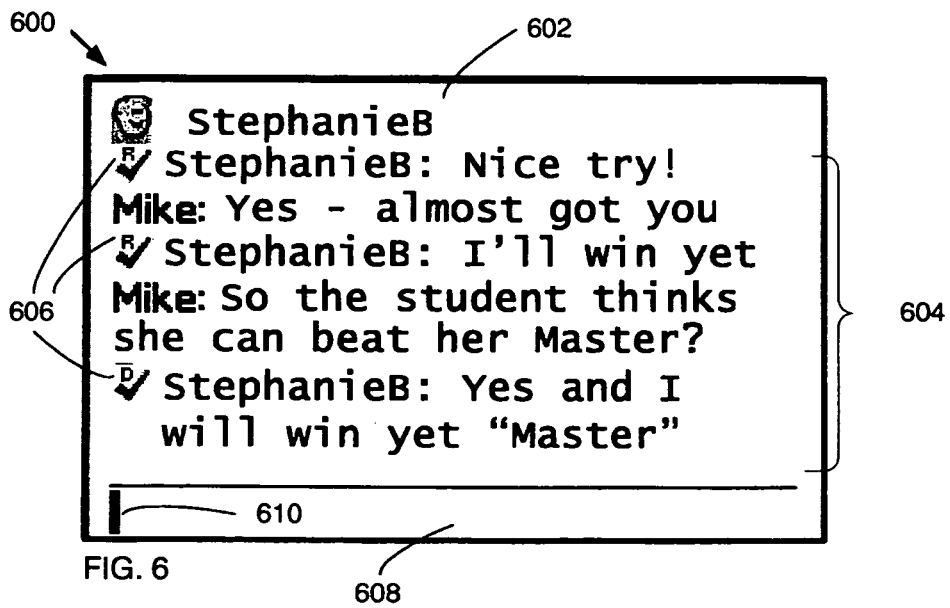

FIG. 6 illustrates a representative IM view 600 of a current conversation with a contact "StephanieB" and comprises a title portion 602 for indicating the contact and a message history portion 604 for showing an exchange of IM conversation messages (from component store 412) and optional delivery and reply status indicators 606 for the messages. A message composition portion 608 with a cursor 610 is also provided with which to compose IM conversation messages persisted to the contact.

As noted, a client device (e.g. 202, 308 or 310) communicates with enterprise IM server 304 in accordance with a generic client to server protocol for Instant Messaging services. An advantage of the protocol is that it facilitates the development/implementation of a single device instant messaging client that may be used to connect to a variety of enterprise IM servers via a server proxy.

Device/server communications comprise commands and if applicable, responses. The communications are defined by data packets transmitted via the network according to network-level and/or any intermediate-level transport protocols. In the present embodiment, the commands and responses are sent within GME packets.

GME packets are preferably encrypted for transmission. Each GME packet may contain one or more messages containing commands or responses. Commands and responses are preferably Tag Length Encoded (TLE) to conserve transmission bandwidth. Such is particularly advantageous in a wireless communications network (e.g. 104) for transport to devices 202, for example. Each field comprises a single byte tag followed by a bit-extended length and the message data. Unrecognized fields may be skipped:

Message=*tle
tle=tag length data
tag=OCTET
length=1-4OCTET
data=0*OCTETTags

Tags are defined herein below and are unique only within each the field. Fields within each TLE field are ordered to match their occurrence in this document.

Each type has a single type as defined in this document and strings are preferably encoded as UTF8.

If an expected element is not present then the protocol implementation preferably uses a value from the following unless a default is explicitly defined: Boolean—false; Int—0; and String—null.

For packets that include a resultCode, a missing result code means success. The result codes are as follows: 100—Request denied; 200—Successful/Request accepted; and 300—Unsuccessful/Error.

The server may run more than one IM service. In the case, all packets that originate from a client device contain an extra integral field in the beginning identifying the service the packet is intended for.

In a GME packet, the content ID is used to designate an IM communication e.g. "IM". Service application date in TLE form indicates a configurationID to provide the client with appropriate graphics, text, and service details for supported features for a specific IM server.

As noted, device/server messages may be broadly categorized by command type as follows: session management, contact list management, presence management, IM conversation messages, multiple participant conversations and message sequences as described further below. Session Management commands comprise login request, login response, logout and keepAlive.

The login request is sent by the device in response to a client request to login. The GME packets are assumed to be encrypted so the userID and password may be sent immediately.

The following table describes a login request:

| LoginRequest Tag 1 | | | | | |
|---|---|---|---|---|---|
| | | | Occurs | | |
| Name | Tag | Type | min | max | Details |
| clientRev | 1 | String | 1 | 1 | The current build of the client. |
| configId | 2 | String | 1 | 1 | The configuration ID taken from the service book configuration. |
| userId | 3 | String | 1 | 1 | The userID provided by the user. |
| password | 4 | String | 1 | 1 | The password provided by the user. |
| etag | 5 | String | 0 | 1 | The last etag received by the client |
| initStatusIcon | 6 | int | 0 | 1 | Initial status. |
| server | 7 | String | 0 | 1 | Hostname, port of the IM server to connect to, separated by a colon, i.e. hostname:port. If this field |

| LoginRequest Tag 1 | | | | | |
|---|---|---|---|---|---|
| | | | Occurs | | |
| Name | Tag | Type | min | max | Details |
| | | | | | does not exist the server will use the installation defaults. |

The login response from the server includes a result code. If successful the login result is followed immediately and automatically by a contact list update, as necessary, offline messages, and AcceptContact notifications according to the following table:

| LoginResponse Tag 2 | | | | | |
|---|---|---|---|---|---|
| | | | Occurs | | |
| Name | Tag | Type | min | max | Details |
| resultCode | 1 | int | 0 | 1 | |
| resultMessage | 2 | String | 0 | 1 | Message for the user. |
| displayName | 3 | String | 1 | 1 | The user's display name. |
| id | 4 | String | 0 | 1 | The user's contactId. |

When a user logs out, the device sends the server this packet. The device requires no response from the server. When the server logs out the user, it sends the device this packet. It also requires no response from the device. In this case, the server preferably provides an explanation to the user why there is a logged out.

| Logout Tag 3 | | | | | |
|---|---|---|---|---|---|
| | | | Occurs | | |
| Name | Tag | Type | min | max | Details |
| message | 1 | String | 0 | 1 | Optional explanation for the user.. |

The client may be configured to send a message to the server in order to keep the session alive. The device sends the server this packet every 15 minutes (for example). The server should respond with the same packet before the next cycle. If the server is unable to respond it logs the user out of the service, and the device logs the user out of the client when it sees that there has been no response before the next cycle.

| KeepAlive Tag 4 | | | | | |
|---|---|---|---|---|---|
| | | | Occurs | | |
| Name | Tag | Type | min | max | Details |
| null | | | | | |

Contact List Management commands comprise the following command types to manage a contact list 410 and 430: Contact List Update, Add Group Request, Add Group Response, Remove Group Request, Remove Group Response, Rename Group Request, Rename Group Response, Add Contact Request, Add Contact Response, Accept Contact Request, Accept Contact Response, Remove Contact Request, Remove Contact Response, Rename Contact Request, Rename Contact Response, Move Contact Request, Move Contact Response, Block Contact Request, and Block Contact Response.

Commands initiated from the client device are not typically tracked by IM management component 406 of the client. As such, server responses are configured to include all required information in the response.

The etag is treated as an opaque string identifier for the current state of the contact list 410 and 430. The etag is stored by the client and no semantic meaning is derived from it. The etag is updated with each response that changes the contents of the contact list and is reported to the IM server 304 on login (see Login Request). The IM server 304 may use this value to represent a current state of the contact list which value may be defined by the time of the last contact list change or a hash of the contact list contents, by way of two examples, in order to detect whether an update to the contact list is necessary on login.

Contact IDs and Group IDs are identifiers used to track contacts or groups independent of their friendly or display name. The client derives no semantic meaning from these IDs and only exact comparisons (Boolean results) need be made against them.

A Contact List Update is sent from the server on login. The client device (IM Management component 406) replaces any local instance of the contact list with the contents of the message.

| Name | Tag | Type | Occurs min | Occurs max | Details |
|---|---|---|---|---|---|
| | | ContactListUpdate Tag6 | | | |
| etag | 1 | String | 0 | 1 | |
| groups | 2 | Group | 0 | unbounded | |
| | | Group Tag | | | |
| name | 1 | String | 1 | 1 | Group display name |
| id | 2 | String | 1 | 1 | Group identifier |
| contacts | 3 | Contact | 0 | unbounded | |
| | | Contact Tag | | | |
| name | 1 | String | 1 | 1 | Display Name |
| id | 2 | String | 1 | 1 | Contact Identifier |
| blocked | 3 | boolean | 0 | 1 | Whether this contact has been blocked by the user. |
| pending | 4 | boolean | 0 | 1 | Whether the user is waiting for authorization from the contact. In systems not requiring authorization, this is always false. |

The following tables AddGroupRequest, AddGroupResponse, RemoveGroupRequest, RemoveGroupResponse, RenameGroupRequest and RenameGroupResponse provide commands and respective responses for managing groups to add, remove and rename such.

| Name | Tag | Type | Occurs min | Occurs max | Details |
|---|---|---|---|---|---|
| | | AddGroupRequest Tag 7 | | | |
| name | 1 | String | 1 | 1 | |
| | | AddGroupResponse Tag 8 | | | |
| resultCode | 1 | int | 0 | 1 | |
| resultMessage | 2 | String | 0 | 1 | Message for the user. |
| etag | 3 | String | 0 | 1 | |
| name | 4 | String | 0 | 1 | |
| id | 5 | String | 0 | 1 | |
| | | RemoveGroupRequest Tag 9 | | | |
| groupId | 1 | String | 1 | 1 | |
| groupName | 2 | String | 1 | 1 | |
| | | RemoveGroupResponse Tag 10 | | | |
| resultCode | 1 | int | 0 | 1 | |
| resultMessage | 2 | String | 0 | 1 | Message for the user. |
| etag | 3 | String | 0 | 1 | |
| groupId | 4 | String | 0 | 1 | One of groupId or groupName must not be null. |
| groupName | 5 | String | 0 | 1 | One of groupId or groupName must not be null. |
| | | RenameGroupRequest Tag 11 | | | |
| groupId | 1 | String | 1 | 1 | |
| oldName | 2 | String | 1 | 1 | |
| newName | 3 | String | 1 | 1 | |
| | | RenameGroupResponse Tag 12 | | | |
| resultCode | 1 | int | 0 | 1 | Result code. No Result Code indicates success. |
| resultMessage | 2 | String | 0 | 1 | Message for the user. |
| etag | 3 | String | 0 | 1 | |
| groupId | 4 | String | 0 | 1 | One of groupId or oldName must not be null. |
| oldName | 5 | String | 0 | 1 | One of groupId or oldName must not be null. |
| name | 6 | String | 1 | 1 | |

The following commands and response describe message operations for managing contacts within groups. The Add Contact Request command adds a contact to the specified group. The contact may or may not be the same as the contacted returned in AddContactResponse. It is the contacted in AddContactResponse that uniquely represents the user in all other messages. A contact is added in the client device contact list 410 only when the AddContactResponse is received.

| Name | Tag | Type | Occurs min | Occurs max | Details |
|---|---|---|---|---|---|
| | | AddContactRequest Tag 13 | | | |
| contact | 1 | String | 1 | 1 | |
| groupId | 2 | String | 0 | 1 | The id of an existing group to place the new contact in when the request is accepted. One of |

-continued

AddContactRequest
Tag 13

| Name | Tag | Type | Occurs min | Occurs max | Details |
|---|---|---|---|---|---|
| groupName | 3 | String | 0 | 1 | groupId or groupName must not be null. The name of an existing group to place the new contact in when the request is accepted. One of |
| message | 4 | String | 0 | 1 | groupId or groupName must not be null. A message for other user in systems requiring authorization. |

The server sends an Update Presence (see below) for the newly added contact, preferably immediately, after sending this message.

| Name | Tag | Type | Occurs min | Occurs max | Details |
|---|---|---|---|---|---|
| *AddContactResponse Tag 14* | | | | | |
| resultCode | 1 | int | 0 | 1 | Result code. No Result Code indicates success. |
| resultMessage | 2 | String | 0 | 1 | Message for the user. |
| etag | 3 | String | 0 | 1 | |
| name | 4 | String | 0 | 1 | |
| contactId | 5 | String | 0 | 1 | |
| contact | 6 | String | 0 | 1 | Corresponds to contact in AddContactRequest. This field is absent if contact is the same as contactId. |
| groupId | 7 | String | 0 | 1 | The id of an existing group to place the new contact in. One of groupId or groupName must not be null. |
| groupName | 8 | String | 0 | 1 | The name of an existing group to place the new contact in when the request is accepted. One of groupId or groupName must not be null. |
| *AcceptContactRequest Tag 15* | | | | | |
| contactId | 1 | String | 1 | 1 | |
| message | 2 | String | 0 | 1 | |
| *AcceptContactResponse Tag 16* | | | | | |
| contactId | 1 | String | 1 | 1 | |
| accepted | 2 | boolean | 1 | 1 | |
| message | 3 | String | 0 | 1 | |
| *RemoveContactRequest Tag 17* | | | | | |
| contactId | 1 | String | 1 | 1 | |
| groupId | 2 | String | 0 | 1 | If this field does not exist, then the contact will be deleted from all groups it belong to. Otherwise, it will be deleted from the specified group. |
| groupName | 3 | String | 0 | 1 | If this field does not exist, then the contact will be deleted from all groups it belong to. |

-continued

| Name | Tag | Type | Occurs min | Occurs max | Details |
|---|---|---|---|---|---|
| | | | | | Otherwise, it will be deleted from the specified group. |
| RemoveContactResponse Tag 18 | | | | | |
| resultCode | 1 | int | 0 | 1 | Result code. No Result Code indicates success. |
| resultMessage | 2 | String | 0 | 1 | Message for the user. |
| etag | 3 | String | 0 | 1 | |
| contactId | 4 | String | 0 | 1 | |
| groupId | 5 | String | 0 | 1 | If this field does not exist, then the contact will be deleted from all groups it belong to. Otherwise, it will be deleted from the specified group. |
| groupName | 6 | String | 0 | 1 | If this field does not exist, then the contact will be deleted from all groups it belong to. Otherwise, it will be deleted from the specified group. |
| RenameContactRequest Tag 19 | | | | | |
| contactId | 1 | String | 1 | 1 | |
| name | 2 | String | 1 | 1 | |
| RenameContactResponse Tag 20 | | | | | |
| resultCode | 1 | int | 0 | 1 | Result code. No Result Code indicates success. |
| resultMessage | 2 | String | 0 | 1 | Message for the user. |
| contactId | 3 | String | 1 | 1 | |
| name | 4 | String | 1 | 1 | |
| MoveContactRequest Tag 32 | | | | | |
| contactId | 1 | String | 1 | 1 | |
| oldGroupId | 2 | String | 1 | 1 | The id of the group the contact is currently in. |
| newGroupId | 3 | String | 1 | 1 | The id of an existing group to move the contact to. |
| oldGroupName | 4 | String | 1 | 1 | The name of the group the contact is currently in. |
| newGroupName | 5 | String | 1 | 1 | The name of an existing group to move the contact to. |
| MoveContactResponse Tag 33 | | | | | |
| resultCode | 1 | int | 0 | 1 | Result code. No Result Code indicates success. |
| resultMessage | 2 | String | 0 | 1 | Message for the user. |
| etag | 3 | String | 0 | 1 | |
| contactId | 4 | String | 1 | 1 | |
| oldGroupId | 5 | String | 1 | 1 | The id of the group the contact is currently in. One of oldGroupId or oldGroupName must not be null. |
| newGroupId | 6 | String | 1 | 1 | The id of an existing group to move the contact to. One of newGroupId or newGroupName must not be null. |
| oldGroupName | 7 | String | 0 | 1 | One of oldGroupId or oldGroupName must not be null. |

-continued

| Name | Tag | Type | Occurs min | max | Details |
|---|---|---|---|---|---|
| newGroupName | 8 | String | 0 | 1 | One of newGroupId or newGroupName must not be null. |

BlockContactRequest
Tag 21

| contactId | 1 | String | 1 | 1 | |
| block | 2 | boolean | 1 | 1 | |

BlockContactResponse
Tag 22

| resultCode | 1 | int | 0 | 1 | Result code. No Result Code indicates success. |
| resultMessage | 2 | String | 0 | 1 | Message for the user. |
| etag | 3 | String | 0 | 1 | |
| contactId | 4 | String | 1 | 1 | |
| block | 5 | boolean | 1 | 1 | |

Presence, an availability for communications indicator, is an important part of the concept of IM. The user presence statuses may vary depending on the proxied protocol.

"StatusIcon" is merely an index into a resource which displays the status to the user and the device derives no meaning from it. The user's or contact's availability (logged in or logged out) is meaningful, however, and it should be sent in the "available" field.

The following presence related commands permit a user to indicate a current presence preference and receive current presence updates for other contacts from the IM server:

| Name | Tag | Type | Occurs min | max | Details |
|---|---|---|---|---|---|

SetPresence
Tag 23

| available | 1 | boolean | 1 | 1 | |
| statusIcon | 2 | int | 1 | 1 | |
| message | 3 | String | 0 | 1 | |

UpdatePresence
Tag 24

| contactId | 1 | String | 1 | 1 | |
| available | 2 | boolean | 1 | 1 | |
| mobile | 3 | boolean | 1 | 1 | |
| statusIcon | 4 | int | 1 | 1 | |
| message | 5 | String | 0 | 1 | |

The IM conversation message commands of the present protocol are Typing, Message and MultiMessage during a conversation, the Typing commands indicates that the user of the client device is typing a message or that a contact with whom the user is engaged in a conversation is typing. The Message and MultiMessage command provides the message for delivery to a single contact in a two participant conversation or one or more contacts in a multi participant conversation (multi chat).

| Name | Tag | Type | Occurs min | max | Details |
|---|---|---|---|---|---|

Typing
Tag 25

| contacted | 1 | String | 1 | 1 | The contact who is typing or not typing. |
| typing | 2 | boolean | 1 | 1 | |
| conversationId | 3 | String | 1 | 1 | |

Message
Tag 26

| fromContactId | 1 | String | 0 | 1 | |
| fromContactName | 2 | String | 0 | 1 | |
| toContactId | 3 | String | 0 | 1 | |
| conversationId | 4 | String | 1 | 1 | |
| body | 5 | String | 1 | 1 | |

A multi chat must be started before sending or receiving messages in the multi chat. That is, an AcceptInvitationResponse or an InviteParticipantResponse (see below) packet must precede the first MultiMessage packet.

MultiMessage
Tag 36

| Name | Tag | Type | Occurs min | max | Details |
|---|---|---|---|---|---|
| fromContactId | 1 | String | 0 | 1 | |
| fromContactName | 2 | String | 0 | 1 | |
| toContactId | 3 | String | 0 | unbounded | |
| conversationId | 4 | String | 1 | 1 | |
| body | 5 | String | 1 | 1 | |

IM conversations may be multi participant whereby three or more contacts engage in IM communications, inviting contacts to take part in the specific conversation. The IM server broadcasts InviteParticipantRequestBroadcast, InviteParticipant Response, and LeaveConversationBroadcast to everybody in the multi participant conversation. There is more than one model for this. 1. The user can invite someone to an existing conversation. 2. The user can create conferences independently from individual conversations.

| Name | Tag | Type | Occurs min | Occurs max | Details |
|---|---|---|---|---|---|
| | | InviteParticipantRequest Tag 27 | | | |
| participantIds | 1 | String | 1 | unbounded | Ids of everybody in the conversation, excluding the sender. |
| conversationId | 2 | String | 1 | 1 | |
| fromContactId | 3 | String | 1 | 1 | The id of the user sending the invite. |
| toContactId | 4 | String | 1 | 1 | The contact to be invited. |
| message | 5 | String | 1 | 1 | The message to send to the invitee. |
| | | InviteParticipantRequestBroadcast Tag 34 | | | |
| conversationId | 1 | String | 1 | 1 | |
| fromContactId | 2 | String | 0 | 1 | The id of the user sending the invite. |
| fromContactName | 3 | String | 0 | 1 | |
| toContactId | 4 | String | 1 | 1 | The contact to be invited. |
| toContactName | 5 | String | 0 | 1 | |

The response Codes returned in an InviteParticipantResponse are:
    100 means invitation denied
    200 means invitation accepted
    300 for other errors

| Name | Tag | Type | Occurs min | Occurs max | Details |
|---|---|---|---|---|---|
| | | InviteParticipantResponse Tag 28 | | | |
| resultCode | 1 | int | 1 | 1 | |
| resultMessage | 2 | String | 0 | 1 | Message for the user. |
| conversationId | 3 | String | 1 | 1 | |
| contactId | 4 | String | 1 | 1 | The contact who was invited. |
| contactName | 5 | String | 0 | 1 | |
| | | AcceptInvitationRequest Tag 29 | | | |
| participantIds | 1 | String | 1 | unbounded | |
| participantNames | 2 | String | 1 | unbounded | |
| conversationId | 3 | String | 1 | 1 | |
| fromContactId | 4 | String | 1 | 1 | |
| fromContactName | 5 | String | 0 | 1 | |
| message | 6 | String | 1 | 1 | |
| | | AcceptInvitationResponse Tag 30 | | | |
| participantIds | 1 | String | 1 | unbounded | |
| conversationId | 2 | String | 1 | 1 | |
| accepted | 3 | boolean | 1 | 1 | |
| message | 4 | String | 1 | 1 | review |
| | | LeaveConversation Tag 31 | | | |
| participantIds | 1 | String | 1 | unbounded | |
| conversationId | 2 | String | 1 | 1 | |
| contactId | 3 | String | 1 | 1 | The contact who is leaving the conversation. |

-continued

|  |  |  | Occurs | | |
|---|---|---|---|---|---|
| Name | Tag | Type | min | max | Details |
| LeaveConversationBroadcast | | | | | |
| Tag 35 | | | | | |
| conversationId | 1 | String | 1 | 1 | |
| contacted | 2 | String | 1 | 1 | The contact who is leaving the conversation. |

The following tables indicate message sequences for particular operations. Italics indicate optional message packets communications.

| Device | Server |
|---|---|
| Login | |
| LoginRequest | LoginResponse |
| | ContactListUpdate |
| | UpdatePresence (for all contacts in ContactListUpdate) |
| | Message |
| Simple Request/Response Sequences | |
| AddGroupRequest | AddGroupResponse |
| RemoveGroupRequest | RemoveGroupResponse |
| RenameGroupRequest | RenameGroupResponse |
| AddContactRequest | AddContactResponse (if authorization is not required before adding a contact) |
| RemoveContactRequest | RemoveContactResponse |
| RenameContactRequest | RenameContactResponse |
| MoveContactRequest | MoveContactResponse |
| | or |
| | RemoveContactResponse |
| | AddContactResponse |
| BlockContactRequest | BlockContactResponse |

| | Adding a Contact* | | |
|---|---|---|---|
| Action | Device A | Device B | Server |
| A invites B | AddContactRequest | | AcceptContactRequest (to B) |
| B accepts/declines | | AcceptContactResponse | |
| | | | AddcontactResponse (to A) |

(*Only applies if authorization is required before adding a contact.)

Inviting a Participant
Device A and B are in conversation.

| Action | Device A | DevB | Dev C | Server |
|---|---|---|---|---|
| A inv C | InviteParticipantRequest | | | InviteParticipantRequest Broadcast (to B) |
| | | | | AcceptInvitationRequest (to C) |
| C acpt | | | AcceptInvitationResponse | |
| | | | | InviteParticipantResponse (to A, B) |

Leaving a conversation
Device A, B and C are in conversation.

| Action | Device A | Device B | Device C | Server |
|---|---|---|---|---|
| a leaves | LeaveConversation | | | LeaveConversationBroadcast (to B, C) |

The following discussion notes a few protocol variants for differences among the previously described commercial enterprise IM servers.

A Sametime contact has four string representations:
1. loginId, e.g. yyip1. This is unique and not modifiable.
2. userId, e.g. CN=YvonneYip1/OU=Test IDs/O=Ontario. This is unique and not modifiable.
3. name, e.g. Yvonne Yip1/Test IDs/Ontario
4. nickname, modifiable by the user who has the contact in the contact list.

In the IM protocol described herein, a contact has only a contacted and a name. Generally, contacted means the Sametime userID and name means the Sametime nickname, if it exists, otherwise it means the Sametime name. The following clarifies the various cases:

| Name | Protocol Field | Sametime Field |
| --- | --- | --- |
| LoginRequest | userId | loginId |
| LoginResponse | displayName | name |
| Contact | name | nickname if it exists, otherwise name |
|  | id | userId |
| AddContactRequest | contact | loginId |
| AddContactResponse | name | nickname if it exists, otherwise name |
|  | contact | loginId |
|  | contactId | userId |

In terms of IM conversations or chatting, the Sametime server keeps track of conversationIds for multi participant chats only. The device sends the conversationId in a Message packet (Tag 26), but the Sametime server will ignore it and reply with a null in place of the conversationId in a Message packet (Tag 26) although it is marked as required. The Sametime server will remember and use the conversationId field in a MultiMessage packet (Tag 36), however. For multi participant messaging (multi chat) InviteParticipantRequest-Broadcast (Tag 34) is not used in Sametime in terms of InviteParticipantResponse (Tag 28), Sametime does not let a user reject a conference invitation. Therefore, the inviter will receive no InviteParticipantResponse if the invitee rejected the invitation. However, the device lets a user reject the invitation—in that case, a rejection message is sent as a Message packet (Tag 26) to the inviter.

The following represents an index for Sametime Status Icons representing presence:

| Status | Icon |
| --- | --- |
| Offline | 0 |
| Active | 1 |
| Away | 2 |
| Do Not Disturb | 3 |
| Idle | 4 |

The following represents an index for Groupwise Status Icons representing presence:

| Status | Icon |
| --- | --- |
| Offline | 0 |
| Online | 1 |
| Busy | 2 |
| Away | 3 |
| Appear Offline | 4 |
| Idle | 5 |

For LCS servers, when the LCS server receives a MoveContactRequest, it responds with a RemoveContactResponse then a AddContactResponse, if the move is successful. Otherwise, it responds with a MoveContactResponse.

The following represents an index for LCS Status Icons representing presence:

| Status | Icon |
| --- | --- |
| Offline | 0 |
| Online | 1 |
| Busy | 2 |
| Be Right Back | 3 |
| Away | 4 |
| On The Phone | 5 |
| Out To Lunch | 6 |
| Appear Offline | 7 |
| Idle | 8 |

Figure 7:
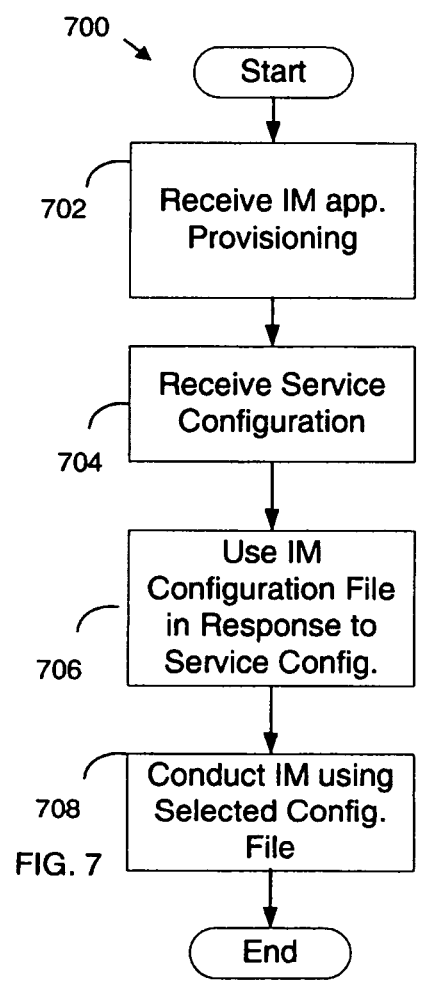
FIG. 7 is a flow chart showing operations for configuring a client device for IM capabilities.

FIG. 7 is a flow chart of operations 700 for configuring (sometime referred to as provisioning) a client device for IM capabilities. At step 702, provisioning data (e.g. a software build of IM application instruction and basic data components is received by a client device (e.g. 202). This provisioning may include IM configuration files (e.g. 409) having graphics, text and definitions of respective IM server capabilities. At step 704, a service definition is received by the client device defining services of the client device (e.g. user definitions, data or data and voice service definitions, enterprise configurations and policies, etc.) including an IM server setting with which to define a configurationID described above. Optionally an IM configuration file may be provisioned at this time. At step 706 the appropriate configuration file 409 is determined using the configurationID and at step 708, IM communications are conducted by client device in accordance with the device/server protocol described.

FIGS. 8A and 8B describe server operations 800 and 820 for managing a contact list on behalf of a particular client device (i.e. for an enterprise user thereof). Operations 800 represent steps to receive client requests to manage (i.e. Charge) a contact list (e.g. group or contact entries) (step 802), update the contact list (804) and maintain an associated etag representing the currency of the contact list on the server (step 806). At step 808 the IM server's etag value is provided to the client device in a response to the client device's contact management request. This etag value is persisted by the client device (not shown) and returned in any login request by the client device as described with reference to operations 820 of FIG. 8B.

At steps 822 and 824 of FIG. 8B then, a contact list is defined by the IM server and etag value created by the server. These steps 822 and 824 may be performed upon provisioning the user's account on the IM server and represent steps prior to a first login or steps may be represented by steps 804 and 806 for subsequent logins. The client device login request with a client device's etag value is received at step 826. Automatically but in response to the currency of the client's etag relative to the server etag value (i.e. if not equal), following a (successful) LoginResponse, a ContactListUpdate message is sent to replace any client device persisted contact list 410. Further automatic messages may be sent such as UpdatePresence for any contacts in the ContactListUpdate (Step 826). Other messages may be Message type (Tag 26) or AcceptContactRequest (not shown).

While discussed primarily with reference to providing a protocol between an enterprise server and handheld mobile devices such as a smart PDA or smart phone, client-side IM applications may be implemented in accordance with the protocol on other computing devices such as personal computers (laptops, desktops), workstations and the like configured for network communications.

The above-described embodiments are intended to be examples only. Those of skill in the art may effect alterations, modifications and variations to the particular embodiments without departing from the scope of the application. The subject matter described herein in the recited claims intends to cover and embrace all suitable changes in technology.

We claim:

1. A method of a server device managing a contact list for a client device, the method comprising:
    the server device defining a tag representing the currency of a contact list corresponding to the client device, the contact list comprising one or more groups of at least one contact associated with a plurality of IM services;
    the server device storing the tag;
    the server device updating the tag in response to updates to the contact list;
    the server device receiving from the client device, a value corresponding to a copy of the tag as previously stored by the client device;
    the server device comparing the value received from the client device to the tag stored by the server device to determine if a contact list update is required on the client device;
    for inbound IM communications, the server device:
        receiving an inbound data packet sent by said client device in accordance with a generic client to server protocol for said plurality of IM services;
        determining a configuration ID indicated in the inbound data packet, the configuration ID defining a specific IM server; and
        connecting said client device to said specific IM server; and
    for outbound IM communications, the server device:
    sending an outbound data packet according to the generic client to server protocol by including a corresponding configuration ID indicating from which of a plurality of different IM server types the outbound data packet is being sent to enable a recipient device to load a configuration file according to the configuration ID, the recipient device storing more than one such configuration file to address the plurality of different IM server types.

2. The method according to claim 1, wherein the value received from the client device is received with a login request from the client device.

3. The method according to claim 1, wherein the tag comprises a time of the last contact list change or a hash of the contact list contents to represent the currency of the contact list.

4. The method according to claim 1, further comprising providing the tag to the client device prior to the updating.

5. The method according to claim 1, further comprising the server device sending a contact list update comprising the tag, to the client device, to enable the client device to store an updated value corresponding to the tag provided with the contact list update.

6. The method according to claim 1, further comprising the server device defining the contact list for the client device upon provisioning an account on the server device.

7. The method according to claim 1, wherein the updating is performed in response to a request to change the contact list received from the client device.

8. The method according to claim 7, further comprising the server device sending an updated tag to the client device in response to the request to change the contact list.

9. A server device comprising a processor and memory for managing a contact list for a client device, the server device being operable for:
    the processor defining a tag representing the currency of a contact list corresponding to the client device, the contact list comprising one or more groups of at least one contact associated with a plurality of IM services;
    the processor storing the tag in the memory;
    the processor updating the tag in response to updates to the contact list;
    the processor receiving from the client device, a value corresponding to a copy of the tag as previously stored by the client device;
    the processor comparing the value received from the client device to the tag stored by the server device to determine if a contact list update is required on the client device;
    for inbound IM communications, the processor:
        receiving an inbound data packet sent by said client device in accordance with a generic client to server protocol for said plurality of IM services;
        determining a configuration ID indicated in the inbound data packet, the configuration ID defining a specific IM server; and
        connecting said client device to said specific IM server; and
    for outbound IM communications, the processor:
    sending an outbound data packet according to the generic client to server protocol by including a corresponding configuration ID indicating from which of a plurality of different IM server types the outbound data packet is being sent to enable a recipient device to load a configuration file according to the configuration ID, the recipient device storing more than one such configuration file to address the plurality of different IM server types.

10. The server device according to claim 9, wherein the value received from the client device is received with a login request from the client device.

11. The server device according to claim 9, wherein the tag comprises a time of the last contact list change or a hash of the contact list contents to represent the currency of the contact list.

12. The server device according to claim 9, further configured for providing the tag to the client device prior to the updating.

13. The server device according to claim 9, further server device sending a contact list update comprising the tag, to the client device, to enable the client device to store an updated value corresponding to the tag provided with the contact list update.

14. The server device according to claim 9, further configured for defining the contact list for the client device upon provisioning an account on the server device.

15. The server device according to claim 9, wherein the updating is performed in response to a request to change the contact list received from the client device.

16. The server device according to claim 9, further configured for sending an updated tag to the client device in response to the request to change the contact list.

17. A method of a client device having a server device manage a contact list therefor, the method comprising:
    the client device receiving from the server device, a tag representing the currency of a contact list corresponding to the client device which is stored and updated by the server device, the contact list comprising one or more groups of at least one contact associated with a plurality of IM services;
    the client device storing a value corresponding to a copy of the tag;
    the client device sending the value to the server device;
    if the value is different from a current tag stored by the server device, the client device receiving a new tag indicative of a contact list update being required on the client device;
    for inbound IM communications, the client device:
        receiving an inbound data packet sent in accordance with a generic client to server protocol for said plurality of IM services;
        determining a configuration ID indicated in the inbound data packet, the configuration ID defining a specific IM server;
        loading a configuration file for the specific IM server according to the configuration ID, the client data communications device storing more than one such configuration file to address a plurality of different IM server types and to provide a single device IM client application that may be used to connect to a plurality of IM servers;
        configuring a graphical user interface (GUI) for said IM client application according to said configuration file;
        configuring service features unique to said specific IM server according to said configuration file; and
    for outbound IM communications, the client device:
        sending an outbound data packet according to the generic client to server protocol by including a corresponding configuration ID indicating with which of the plurality of IM servers the outbound data packet is associated.

18. The method according to claim 17, wherein the value is sent to the server device with a login request.

19. The method according to claim 17, wherein the tag comprises a time of the last contact list change or a hash of the contact list contents to represent the currency of the contact list.

20. The method according to claim 17, further comprising the client device receiving a contact list update comprising the new tag; and the client device storing an updated value corresponding to the new tag.

21. The method according to claim 17, further comprising provisioning an account on the server device to enable the server device to define the contact list for the client device.

22. The method according to claim 17, further comprising sending a request to change the contact list to have the server device update the tag.

23. The method according to claim 17, further comprising the client device receiving an updated tag in response to the request to change the contact list.

24. A client device comprising a processor and memory for having a server device manage a contact list therefor, the client device being configured for:
    the processor receiving from the server device, a tag representing the currency of a contact list corresponding to the client device which is stored and updated by the server device, the contact list comprising one or more groups of at least one contact associated with a plurality of IM services;
    the processor storing a value corresponding to a copy of the tag in the memory;
    the processor sending the value to the server device;
    if the value is different from a current tag stored by the server device, the processor receiving a new tag indicative of a contact list update being required on the client device;
    for inbound IM communications, the client device:
        receiving an inbound data packet sent in accordance with a generic client to server protocol for said plurality of IM services;
        determining a configuration ID indicated in the inbound data packet, the configuration ID defining a specific IM server;
        loading a configuration file for the specific IM server according to the configuration ID, the client data communications device storing more than one such configuration file to address a plurality of different IM server types and to provide a single device IM client application that may be used to connect to a plurality of IM servers;
        configuring a graphical user interface (GUI) for said IM client application according to said configuration file;
        configuring service features unique to said specific IM server according to said configuration file; and
    for outbound IM communications, the client device:
        sending an outbound data packet according to the generic client to server protocol by including a corresponding configuration ID indicating with which of the plurality of IM servers the outbound data packet is associated.

25. The client device according to claim 24, wherein the value is sent to the server device with a login request.

26. The client device according to claim 24, wherein the tag comprises a time of the last contact list change or a hash of the contact list contents to represent the currency of the contact list.

27. The client device according to claim 24, further configured for receiving a contact list update comprising the new tag; and storing an updated value corresponding to the new tag.

28. The client device according to claim 24, further configured for provisioning an account on the server device to enable the server device to define the contact list for the client device.

29. The client device according to claim 24, further configured for sending a request to change the contact list to have the server device update the tag.

30. The client device according to claim 29, further configured for receiving an updated tag in response to the request to change the contact list.

* * * * *